United States Patent [19]

Moriyama

[11] Patent Number: 5,402,198
[45] Date of Patent: Mar. 28, 1995

[54] FOCUS DETECTING APPARATUS

[75] Inventor: Keiji Moriyama, Yokohama, Japan

[73] Assignee: Nikon Corporation, Tokyo, Japan

[21] Appl. No.: 868,888

[22] Filed: Apr. 16, 1992

[30] Foreign Application Priority Data

Apr. 23, 1991 [JP] Japan .................................. 3-119523

[51] Int. Cl.$^6$ ............................................. G03B 13/36
[52] U.S. Cl. ...................................................... 354/408
[58] Field of Search ................. 354/408, 406, 407, 402

[56] References Cited

U.S. PATENT DOCUMENTS

| | | | |
|---|---|---|---|
| 5,029,998 | 7/1991 | Utagawa et al. | 354/408 X |
| 5,130,735 | 7/1992 | Kusaka et al. | 354/408 X |
| 5,160,834 | 11/1992 | Moriyama | 354/408 X |

*Primary Examiner*—Michael L. Gellner
*Assistant Examiner*—Jae N. Noh
*Attorney, Agent, or Firm*—Shapiro & Shapiro

[57] ABSTRACT

A focus detecting apparatus for detecting the focus of a photo-taking lens comprises a condenser lens disposed near the predetermined image plane of an object formed by the photo-taking lens, and a plurality of focus detection systems. Each of the focus detection systems comprises pupil dividing means disposed rearwardly of the condenser lens in the direction of the optical axis thereof and having at least one pair of openings for dividing the pupil of the photo-taking lens, at least one pair of re-imaging lenses disposed rearwardly of the pupil dividing means correspondingly to the at least one pair of openings for forming at least one pair of secondary images, and a photoelectric conversion element array having picture elements for detecting the amount of deviation of the relative position of the secondary images. The area of a picture element of the photoelectric conversion element array in each of the focus detection systems is determined in conformity with the area of the openings in the pupil dividing means in that focus detection system.

6 Claims, 5 Drawing Sheets

FOCUS DETECTING APPARATUS

BACKGROUND OF THE INVENTION

1. Field of the Invention

This invention relates to a focus detecting apparatus by a TTL phase difference detection system suitable for use in a camera or the like, and particularly to a focus detecting apparatus suitable for detecting the in-focus state in a plurality of areas in the predetermined image plane of a photo-taking lens.

2. Related Background Art

FIG. 11 of the accompanying drawings shows the basic construction of a focus detecting apparatus of a TTL phase difference detection system. The focus detecting optical system of this focus detecting apparatus is such that a photo-taking lens 10, a field mask 20, a condenser lens 30, a stop mask 40, a re-imaging lens 50, a photoelectric conversion element array 60, etc. are successively disposed on the optical axis O of the photo-taking lens 10.

A light beam transmitted through the exit pupils 11, 12 of the photo-taking lens 10 forms a primary image of an object near the field mask 20 by the photo-taking lens 10. The extraction of the light beam is effected by the field mask 20 to thereby limit the light beam from the object to the condenser lens 30. The light beam transmitted through this condenser lens 30 is re-imaged as a secondary image on the photoelectric conversion element array 60 by the re-imaging lens 50 via the stop mask 40 which likewise limits any unnecessary light beam.

That is, rearwardly of the primary image formed by the photo-taking lens 10, two secondary images substantially similar to the primary image are re-imaged by the condenser lens 30 and the re-imaging lens 50, and the amount of deviation of the relative position of the two secondary images is detected by the photoelectric conversion element array 60.

Although the various members are disposed so that the re-imaged secondary images may be arranged only in one particular direction, the image of the object by the photo-taking lens 10 may have a luminance distribution in any direction and focus detection becomes impossible for an object which does not have a luminance distribution in a direction fit for the focus detecting optical system. Therefore, a plurality of focus detecting optical systems are disposed in different directions.

Heretofore, in such a focus detecting apparatus, the shapes of a pair of openings corresponding to a pair of re-imaging lenses have been made different for each focus detecting optical system and by the use of a light beam from a larger portion (area) in the plane of the exit pupil, the light beam has been utilized efficiently and it has been intended to realize the compactness of each re-imaging lens.

Referring to FIG. 11, the areas of the openings 41 and 42 in each pair of stop masks 40 for dividing the pupil of the photo-taking lens 10 into two areas are made to differ for each focus detecting optical system. Therefore, the levels of signals output from respective photoelectric conversion element arrays 60 disposed in the respective focus detecting optical systems differ from each other in proportion to the areas of the pair of openings for dividing the pupil of the photo-taking lens 10 in each focus detecting optical system into two areas.

This leads to the problem that when focus detection is effected by the plurality of focus detecting optical systems, a difference in intensity of illumination is created between secondary images re-formed on the pair of photoelectric conversion element arrays provided for each focus detecting optical systems and a difference is created between the levels of the output signals from each pair of photoelectric conversion element arrays.

In order to solve such a problem, it would occur to mind to amplify the output signals from the pair of photoelectric conversion element arrays for each focus detecting optical system at different ratios, but this would cause another problem that signal processing will become complicated.

SUMMARY OF THE INVENTION

It is the object of the present invention to provide a focus detecting apparatus in which even if there are disposed a plurality of focus detecting optical systems differing in the direction of the relative positional deviation of secondary images to thereby achieve downsizing and windening of the focus range, output signals from a pair of photoelectric conversion element arrays for each focus detecting optical system are substantially equal and signal processing is easy and stable.

DESCRIPTION OF THE PREFERRED EMBODIMENTS

Figure 11:
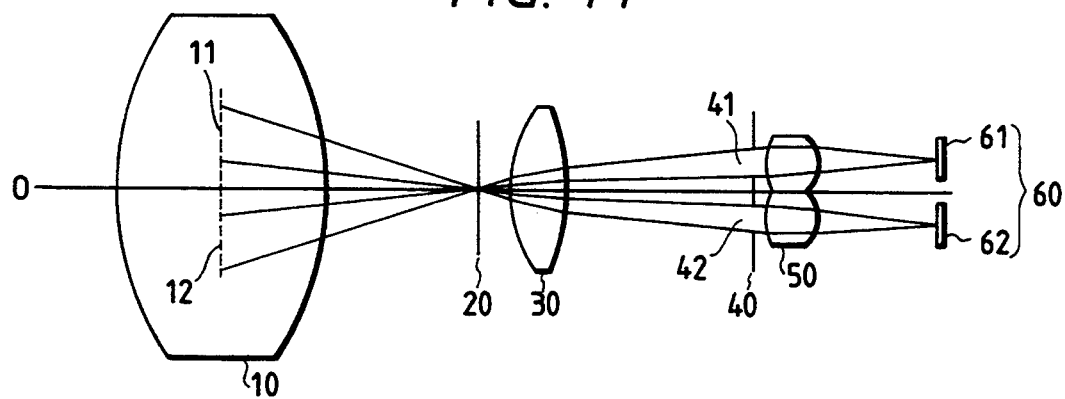
FIG. 11 illustrates the basic principle of a focus detecting optical system.

Some embodiments of the present invention will hereinafter be described in detail with reference to the drawings. FIGS. 1 to 4 show a first embodiment of a focus detecting apparatus according to the present invention, FIG. 1 being a perspective view showing a focus detecting optical system, FIG. 2 being a front view showing a field mask, FIG. 3 being a front view showing a stop mask, and FIG. 4 being a front view showing a photoelectric conversion element array. In these figures, portions functionally similar to those in the basic construction shown in FIG. 11 are given similar reference numerals.

Figure 1:
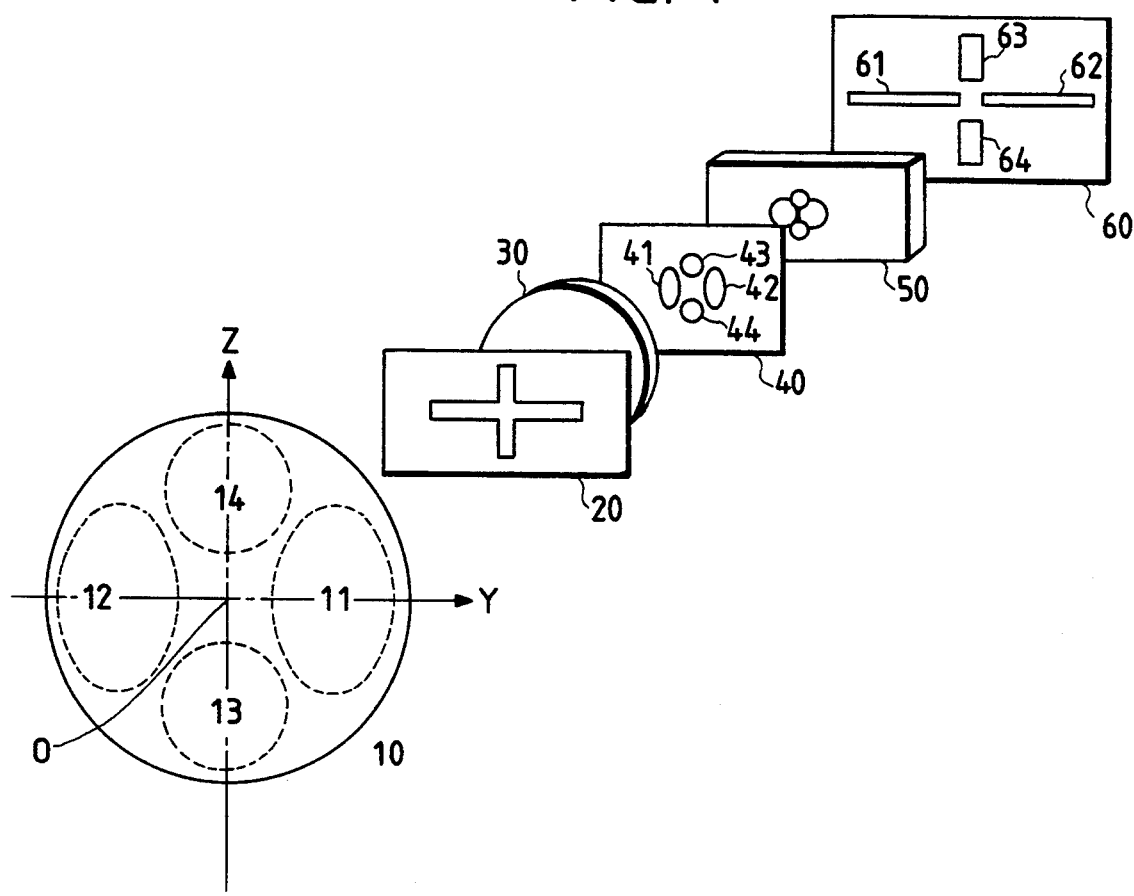
FIG. 1 is a perspective view showing a first embodiment of a focus detecting apparatus according to the present invention.

The focus detecting apparatus of the first embodiment, as shown in FIG. 1, comprises a photo-taking lens 10, a field mask 20, a condenser lens 30, a stop mask 40, a re-imaging lens 50 and a photoelectric conversion element array 60 successively disposed on the optical axis O of the photo-taking lens 10, and has two focus detecting optical systems and orthogonal to each other and corresponding to orthogonal axes Y and Z (for convenience, the systems will respectively be referred to as systems Y and Z).

Two or more such focus detecting optical systems may be disposed, and it is preferable that the directions of the focus detection areas of at least two of the plurality of focus detecting optical systems be orthogonal to each other as described above and contain the optical axis of the photo-taking lens 10. The reason is that the image of a main object can have a brightness distribution in any direction and with high probability, will exist at the center of the photographing image field. Therefore the chance that focus detection would become impossible for the main object can be remarkably reduced.

Figure 2:
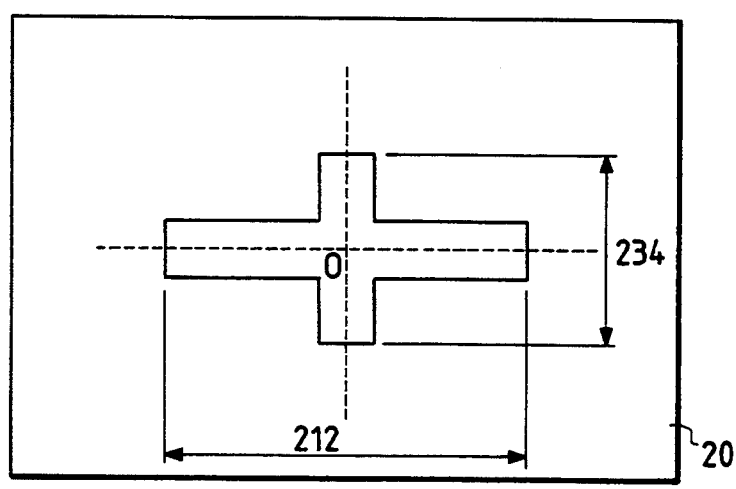
FIG. 2 is a front view showing a stop mask in the first embodiment of the focus detecting apparatus according to the present invention.

The photo-taking lens 10 has exit pupils 11 and 12 in a horizontal direction and exit pupils 13 and 14 in a vertical direction. The field mask 20 serves to limit the light beam from the object to the condenser lens 30, and forms two orthogonal focus detection areas 212 and 234 corresponding to the exit pupils 11, 12 and 13, 14, respectively, of the photo-taking lens 10, as shown in FIG. 2.

Figure 3:
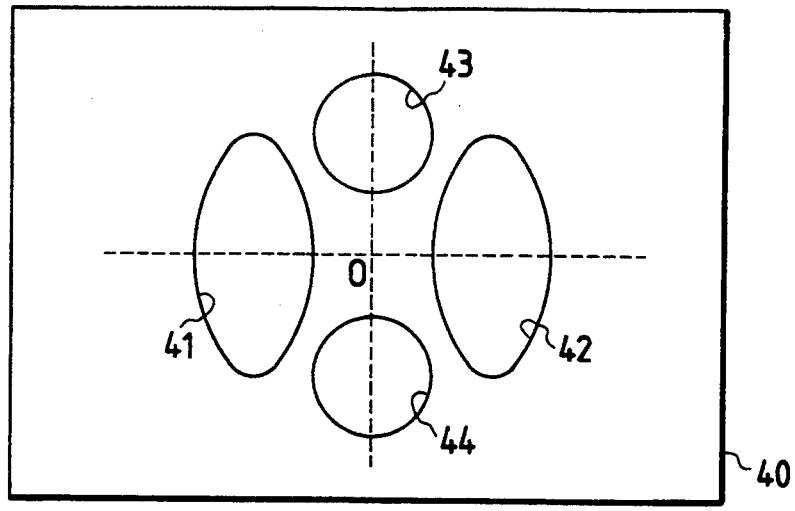
FIG. 3 is a front view showing a field mask in the first embodiment of the focus detecting apparatus according to the present invention.

The stop mask 40, as shown in FIG. 3, is formed with openings 41 and 42 along a horizontal direction and openings 43 and 44 along a vertical direction, and the area of the openings 41, 42 and the area of the openings 43, 44 differ from each other. In the present embodiment, the area of the openings 41, 42 is made larger than the area of the openings 43, 44. Also, design is made such that the distances from the optical axis O of the photo-taking lens to the positions of the centers of gravity of the openings 41, 42, 43 and 44 are substantially equal to one another and the radius of a circumscribed circle containing the openings 41, 42 and the radii of two circumscribed circles containing the openings 43, 44 are substantially equal to each other.

Figure 4:
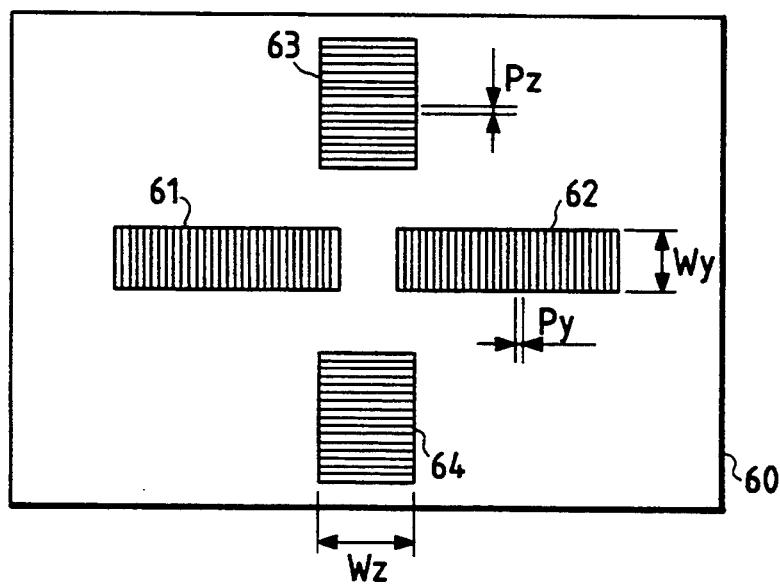
FIG. 4 is a front view showing a photoelectric conversion element array in the first embodiment of the focus detecting apparatus according to the present invention.

The photoelectric conversion element array 60, as shown in FIG. 4, has photoelectric conversion element arrays 61 and 62 disposed along a horizontal direction and photoelectric conversion element arrays 63 and 64 disposed along a vertical direction. The photoelectric conversion element arrays 61 and 62 correspond to the two areas of the exit pupils 11, 12 of the photo-taking lens 10 and the stops 41, 42 of the stop mask 40, and the photoelectric conversion element arrays 63 and 64 correspond to the two areas of the exit pupils 13, 14 of the photo-taking lens 10 and the stops 43, 44 of the stop mask 40.

In the present embodiment, the element width Wy of the horizontal photoelectric conversion element arrays 61, 62 and the element width Wz of the vertical photoelectric conversion element arrays 63, 64 differ from each other. More particularly, the element width Wz of the photoelectric conversion element arrays 63, 64 (for which the opening area of the stops 43, 44 of the stop mask 40 is smaller) is made greater. That is, the element widths Wy and Wz are set to the relation that Wy<Wz.

The intensity of illumination of the image plane is proportional to the solid angle of the light beam reading the image and therefore is proportional to the area of the divided regions of the pupil (exit pupil) of the photo-taking lens 10. That is, the intensity of illumination of the image plane of a secondary image formed on a pair of photoelectric conversion element arrays in the focus detecting optical system is proportional to the area of the pupil of the re-imaging lens 50, i.e., the area of the pair of openings 41 and 42 which divide the pupil of the photo-taking lens 10 into two areas. On the other hand, the signal levels of the photoelectric conversion element arrays 61, 62 and 63, 64 are proportional to the area of the picture elements and the intensity of illumination of the surfaces of the elements. Therefore, the signal levels output from the pairs of photoelectric conversion element arrays 61, 62 and 63, 64 by the focus detecting optical systems Y and Z differ from each other in proportion to the areas of the pairs of openings 41, 42 and 43, 44 in the stop mask 40 which divide the pupil of the photo-taking lens 10 provided in the focus detecting optical systems Y and Z into each two areas 11, 12 and 13, 14. Accordingly, the level difference between these output signals is corrected by making the areas of the picture elements of the pairs of photoelectric conversion element arrays 61, 62 and 63, 64 for the respective focus detecting optical systems Y and Z different from each other.

Also, to correct the level difference between the output signals, it is preferable that the product of the area of the pair of openings and the area of the picture elements of the photoelectric conversion element array in one focus detecting optical system does not exceed twice the product of the area of the pair of openings and the area of the picture elements in the other focus detecting optical system. It is more preferable that the former product be 1.7 or less times the latter product.

As shown in FIG. 4, the pitch Py of the photoelectric conversion element arrays 61, 62 and the pitch Pz of the photoelectric conversion element arrays 63, 64 are made substantially equal to each other. Here, the pitch refers to the width of a picture element of the photoelectric conversion element arrays 61, 62 or 63, 64 in the direction of deviation of the relative position of the secondary images, i.e., the direction of arrangement of the corresponding photoelectric conversion element arrays.

If the pitches Py and Pz of the picture elements are changed with a variation in the areas of the picture elements of the pairs of photoelectric conversion element arrays 61, 62 and 63, 64 for the respective focus detecting optical systems Y and Z, the accuracy of the detection of the amount of deviation of the relative position of the secondary images will differ and therefore, the accuracy of focus detection will differ for each of the focus detecting optical systems Y and Z. However, if the pitches Py and Pz of the picture elements of the photoelectric conversion element arrays 61, 62 and 63, 64 are made equal to each other, when the level difference between the output signals of the pairs of photoelectric conversion element arrays 61, 62 and 63, 64 of the respective focus detecting optical systems Y and Z is corrected, the accuracies of focus detection of the focus detecting optical systems Y and Z can be made equal to each other.

Figure 5:
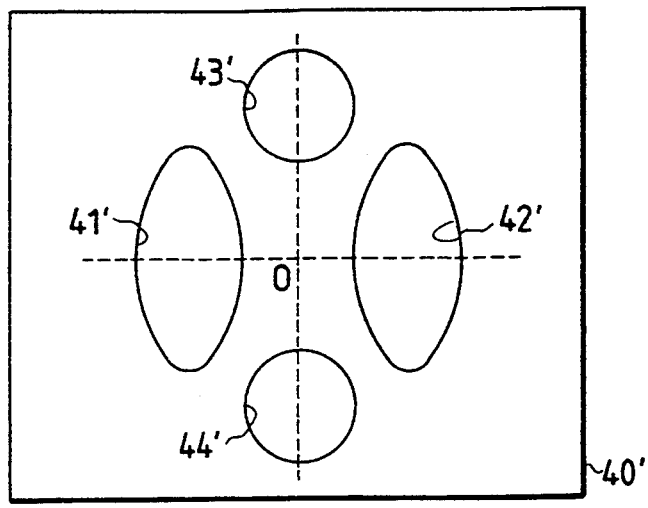
FIG. 5 is a front view showing a stop mask in a second embodiment of the focus detecting apparatus according to the present invention.

FIG. 5 is a front view showing a stop mask in a second embodiment of the focus detecting apparatus according to the present invention. The stop mask 40' of FIG. 5 is one in which the distance from the optical axis O of the photo-taking lens to the positions of the centers of gravity of openings 41', 42' and the distance from the optical axis O of the photo-taking lens to the positions of the centers of gravity of openings 43', 44' are made different from each other.

Figure 6:
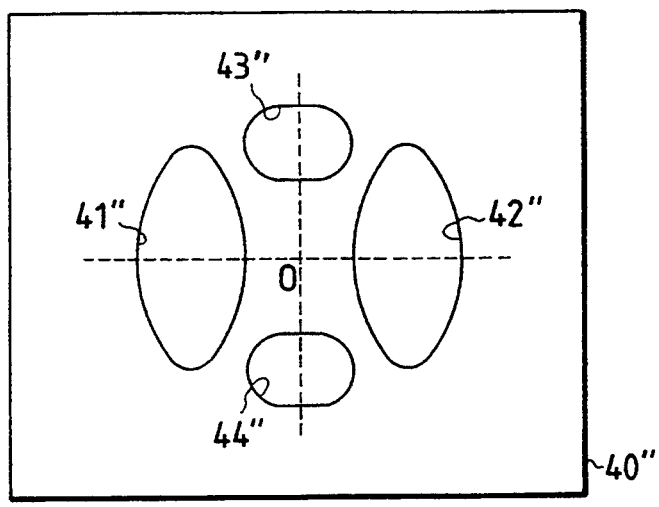
FIG. 6 is a front view showing a stop mask in a third embodiment of the focus detecting apparatus according to the present invention.

FIG. 6 is a front view showing a stop mask in a third embodiment of the focus detecting apparatus according to the present invention. The stop mask 40" of FIG. 6 is one in which the radius of a circumscribed circle containing openings 41", 42" and the radius of a circumscribed circle containing openings 43", 44" are made different from each other.

Figure 7:
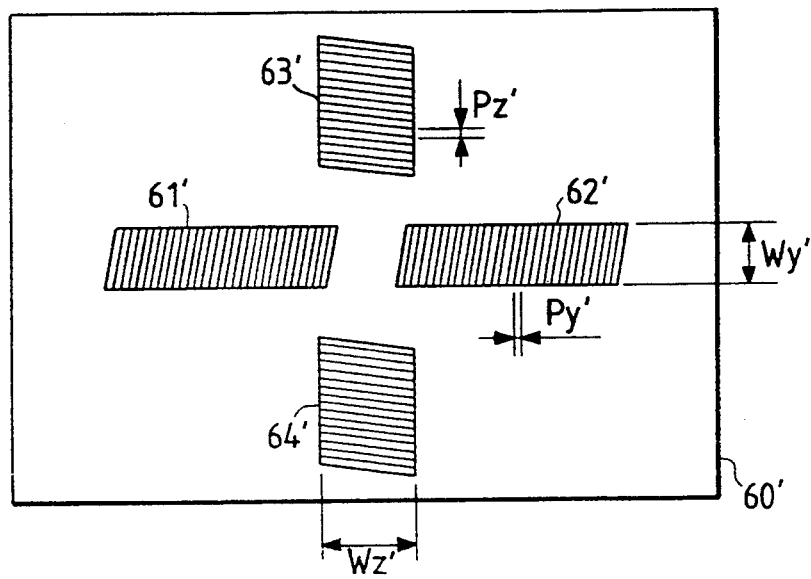
FIG. 7 is a front view showing a photoelectric conversion element array in a fourth embodiment of the focus detecting apparatus according to the present invention.

FIG. 7 is a front view showing a photoelectric conversion element array in a fourth embodiment of the focus detecting apparatus according to the present invention. The elements of arrays 61', 62' and 63', 64' of the photoelectric conversion element arrays 60' are not perpendicular to but inclined with respect to the direction of deviation of the relative position of secondary images. Here, when the pitch of the photoelectric conversion element arrays 61', 62' is Py' and the width of the elements thereof is Wy' and the pitch of the photoelectric conversion element arrays 63', 64' is Pz' and the width of the elements thereof is Wz', Py'=Pz' and Wy'<Wz' are satisfied.

Figure 8:
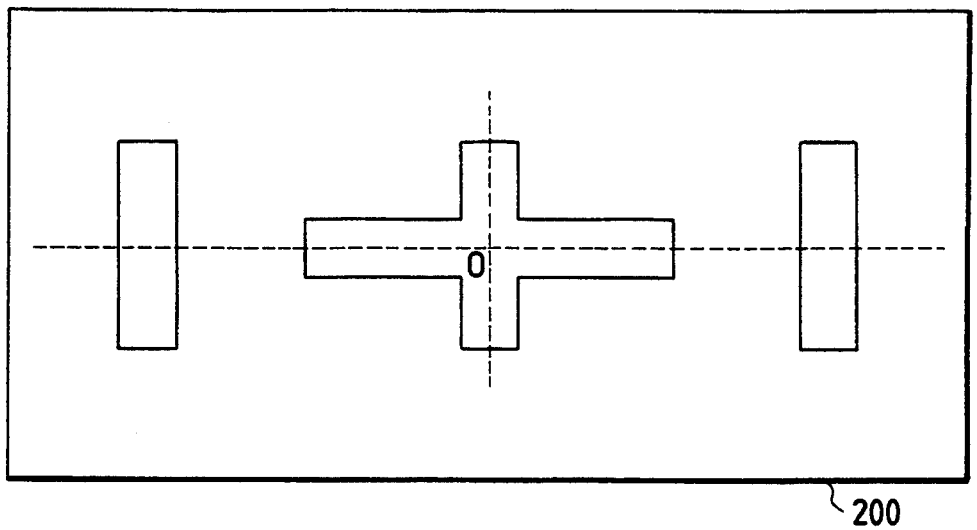
FIG. 8 is a front view showing a field mask in a fifth embodiment of the focus detecting apparatus according to the present invention.
Figure 9:
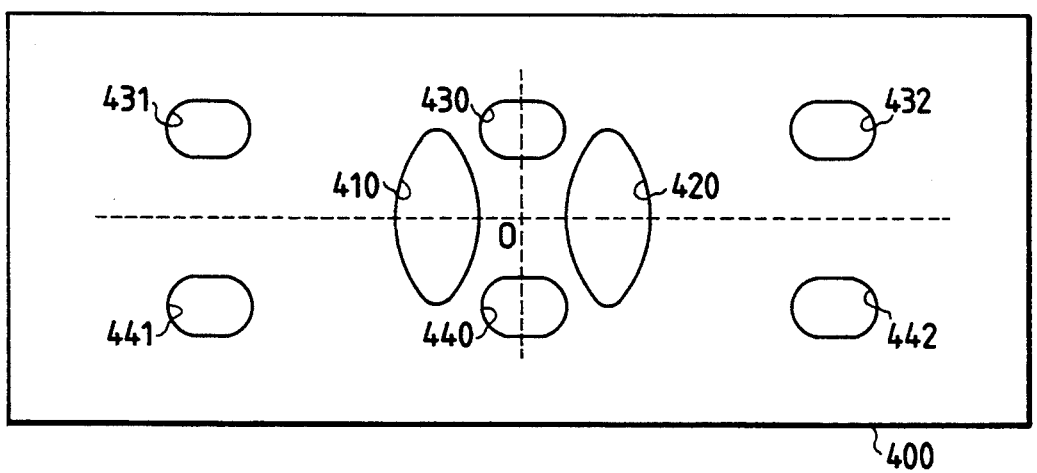
FIG. 9 is a front view showing a stop mask in the fifth embodiment of the focus detecting apparatus according to the present invention.
Figure 10:
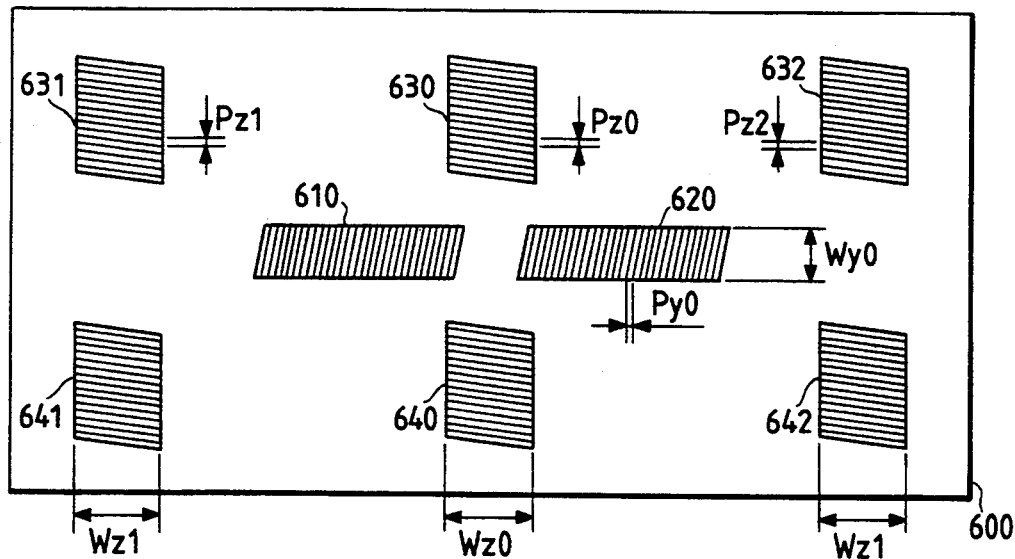
FIG. 10 is a front view showing photoelectric conversion elements in the fifth embodiment of the focus detecting apparatus according to the present invention.

FIGS. 8 to 10 show a fifth embodiment of the focus detecting apparatus according to the present invention, FIG. 8 being a front view showing a field mask, FIG. 9 being a front view showing a stop mask, and FIG. 10 being a front view showing a photoelectric conversion element array. The fifth embodiment is designed to have a distance measuring area (arranged in a vertical direction) also at a position off the optical axis of the photo-taking lens.

The field mask 200, as shown in FIG. 8, prescribes focus detection areas (horizontal and vertical) containing the optical axis O of the photo-taking lens and a focus detection area which does not contain the optical axis O of the photo-taking lens.

The stop mask 400, as shown in FIG. 9, is such that the areas of openings 430, 440, openings 431, 441 and openings 432, 442 are substantially equal to one another and the areas of openings 410, 420 and openings 430, 440 (431, 441, 432, 442) differ from each other. However, the area of the openings 410, 420 is larger than the area of the openings 430, 440 (431, 441, 432, 442). Also, the radius of a circumscribed circle containing the openings 410, 420 and the radii of two circumscribed circles containing the openings 430, 440 differ from each other, and the spacings between the centers of gravity of the opening 430 and the opening 440, the opening 431 and the opening 441, and the opening 432 and the opening 442 are substantially equal to one another.

The photoelectric conversion element array 600, as shown in FIG. 10, is such that the elements of each element array are not perpendicular to but inclined with respect to the direction of deviation of the relative position of secondary images. However, when the pitch of photoelectric conversion element arrays 610, 620 is Py0 and the width of the elements thereof is Wy0, and the pitch of photoelectric conversion element arrays 630, 640 is Pz0 and the width of the elements thereof is Wz0, the pitch of photoelectric element arrays 631, 641 is Pz1 and the width of the elements thereof is Wz1 and the pitch of photoelectric element arrays 632, 642 is Pz2 and the width of the elements thereof is Wz2, the pitches and the widths satisfy the relations that $Py0 \approx Pz0$ ($\approx Pz1 \approx Pz2$) and $Wy0 < Wz0$ ($\approx Wz1 \approx Wz2$).

The present invention is not restricted to the above-described embodiments, and various modifications are possible. For example, with regard to the focus detection areas, the focus detection area which does not contain the optical axis O may be in the horizontal direction, or focus detection areas may be in the horizontal and vertical directions and be orthogonal to each other. Also, the shape of the stop and the areas of the openings may differ for each focus detection area, and the widths of the elements of the photoelectric conversion element arrays may also differ for each focus detection area. Further, for the special purpose of realizing different distance measurement accuracies, the pitch of the photoelectric conversion element arrays may be made to differ only in a certain particular focus detection area.

As described above, according to the present invention, even if the areas of the respective pairs of openings which divide the pupil of the photo-taking lens into two areas differ from each other in each focus detecting optical system, it becomes possible to correct the level difference between the output signals from each pair of photoelectric conversion elements. Accordingly, in a focus detecting apparatus having a plurality of focus detecting optical systems, the output signals from the respective focus detecting optical systems can be made substantially equal to each other, signal processing can be made easy and stable, and the reliability of focus detection can be improved.

What is claimed is:

1. A focus detecting apparatus for detecting the focus of a photo-taking lens, comprising:

a condenser lens disposed near the predetermined image plane of an object formed by said photo-taking lens; and a plurality of focus detection systems each comprising pupil dividing means disposed rearwardly of said condenser lens in the direction of the optical axis thereof and having at least one pair of openings for dividing the pupil of said photo-taking lens, at least one pair of re-imaging lenses disposed rearwardly of said pupil dividing means correspondingly to said at least one pair of openings for forming at least one pair of secondary images, and a photoelectric conversion element array having picture elements for detecting the amount of deviation of the relative position of said secondary images;

with the area of said pair of openings in a first of said focus detection systems being different from that in a second of said focus detection systems, each said picture element in said first system having a first area, each said picture element in said second system having a second area, and each of said first area and said second area being determined in accordance with the area of the corresponding pair of openings such that said first area and said second area are different and respective output signal levels from the photoelectric conversion element arrays of said first and second systems are substantially equal.

2. A focus detecting apparatus according to claim 1, wherein said first and second focus detection systems are such that the directions of the focus detection areas thereof are orthogonal to each other and parts of said focus detection areas intersect each other.

3. A focus detecting apparatus according to claim 2, wherein each of said focus detection areas includes the optical axis of said photo-taking lens.

4. A focus detecting apparatus according to claim 1, wherein the number of said focus detection systems is two, and the product of the area of the openings in the pupil dividing means and the area of a single picture element of the photoelectric conversion element array in one of said two focus detection systems is smaller than twice the product of the area of the openings in the pupil dividing means and the area of a single picture element of the photoelectric conversion element array in the other focus detection system.

5. A focus detecting apparatus according to claim 4, wherein the product of the area of the openings in the pupil dividing means and the area of a single picture element of the photoelectric conversion element array in said one focus detection system is 1.7 or less times the product of the area of the openings in the pupil dividing means and the area of a single picture element of the photoelectric conversion element array in said other focus detection system.

6. A focus detecting apparatus according to claim 1, wherein said picture elements in each photoelectric conversion element array form a single line and the pitch of said picture elements is the same in each array.

* * * * *